United States Patent
Hara

(10) Patent No.: US 10,430,752 B2
(45) Date of Patent: Oct. 1, 2019

(54) STORAGE EQUIPMENT AND DOOR-TO-DOOR DELIVERY SYSTEM

(71) Applicant: FULLTIME SYSTEM CO., LTD., Tokyo (JP)

(72) Inventor: Shuhei Hara, Tokyo (JP)

(73) Assignee: FULLTIME SYSTEM CO., LTD., Tokyo (JP)

( * ) Notice: Subject to any disclaimer, the term of this patent is extended or adjusted under 35 U.S.C. 154(b) by 0 days.

(21) Appl. No.: 15/072,026

(22) Filed: Mar. 16, 2016

(65) Prior Publication Data
US 2016/0275449 A1 Sep. 22, 2016

(30) Foreign Application Priority Data
Mar. 17, 2015 (JP) .................. 2015-053501

(51) Int. Cl.
*G06Q 10/08* (2012.01)
(52) U.S. Cl.
CPC .................. *G06Q 10/0836* (2013.01)
(58) Field of Classification Search
CPC ................. G06Q 10/00; G06Q 20/00
USPC ............................. 340/568.1, 5.73
See application file for complete search history.

(56) References Cited

U.S. PATENT DOCUMENTS

| | | | | |
|---|---|---|---|---|
| 4,894,717 A * | 1/1990 | Komei | ................. | A47G 29/141 348/14.01 |
| 5,308,058 A * | 5/1994 | Mandel | ................. | B65H 39/11 271/289 |
| 6,300,873 B1 * | 10/2001 | Kucharczyk | ......... | A47G 29/141 235/382.5 |
| 6,788,203 B1 * | 9/2004 | Roxbury | ............ | A47G 29/1214 232/35 |
| 8,322,532 B2 * | 12/2012 | Schafer | .................. | B65D 25/10 206/454 |
| 2001/0042024 A1 * | 11/2001 | Rogers | ............... | G06Q 10/0637 705/26.81 |
| 2002/0035515 A1 * | 3/2002 | Moreno | ............... | A47G 29/141 340/5.73 |
| 2002/0184497 A1 * | 12/2002 | Gage | .................... | G06Q 10/087 713/168 |
| 2006/0285655 A1 * | 12/2006 | Little | .................... | G06Q 10/08 379/67.1 |

(Continued)

FOREIGN PATENT DOCUMENTS

JP H0598857 4/1993
JP 2010174581 A * 8/2010

*Primary Examiner* — Tonya Joseph
(74) *Attorney, Agent, or Firm* — Andrew F. Young, Esq.; Lackenbach Siegel, LLP

(57) ABSTRACT

A storage equipment and a door-to-door delivery system stores deliveries in boxes and allows a user easy access to the delivery even when a plurality of separate deliveries to the same resident is delivered during different and multiple times. The system includes a storage equipment element that stores the delivery delivered for a door-to-door delivery service; a control server, connected to the storage equipment via a network which controls data relative to the door-to-door delivery service: a user terminal, connected to the storage equipment via a network and operated by the addressee-user of the delivery and a carrier terminal, connected to the storage equipment via the network and operated by the carrier who delivers the delivery to the addressee-resident.

4 Claims, 13 Drawing Sheets

(56) References Cited

U.S. PATENT DOCUMENTS

2014/0346221 A1* 11/2014 Pendergast ............. A47G 29/12
232/34
2016/0275449 A1* 9/2016 Hara .................. G06Q 10/0836

* cited by examiner

FIG. 3

Resident DB 131

| Resident ID | Name | Room Number | Password |
|---|---|---|---|
| 0001 | ○○ ○○ | 101 | 1112 |
| 0002 | ○○ ○○ | 306 | 6552 |
| 0003 | ○○ ○○ | 505 | 4412 |
| ... | ... | ... | ... |

FIG. 4

Corporation DB 132

| Corporation ID | Name | Belonging Entity | Password | Availability of Multiple Receiving Box |
|---|---|---|---|---|
| 9001 | ○○ ○○ | × × × | 1112 | Yes |
| 9002 | ○○ ○○ | × × × | 6552 | No |
| 9003 | ○○ ○○ | × × × | 4412 | Yes |
| ⋮ | ⋮ | ⋮ | ⋮ | ⋮ |

FIG. 5

Storage Box DB 133

| Storage Box ID | Type | Applicable Room Number | Use State |
|---|---|---|---|
| 01001 | Multiple Receiving | 101 | — |
| 01002 | Single Receiving | — | Not-in-use |
| 01003 | Single Receiving | 104 | Received |
| ⋮ | ⋮ | ⋮ | ⋮ |

FIG. 6

Multiple Receiving History DB 134

| History Control Number | Corporation ID | Received | Time: Stored |
|---|---|---|---|
| 20140801001 | 9003 | Yes | 2014.08.01 11:02 |
| 20140801002 | 9001 | Yes | 2014.08.01 12:11 |
| 20140801003 | 9016 | No | 2014.08.01 12:24 |
| ⋮ | ⋮ | ⋮ | ⋮ |

FIG. 7

Single Receiving History DB 135

| History Control Number | Depositor-Resident ID /Corporation ID | Addressee-Resident ID /Available Corporation ID | Time: Stored |
|---|---|---|---|
| 20140801001 | 0103 | 9016 | 2014.08.01 11:02 |
| 20140801002 | 0301 | 9008 | 2014.08.01 12:11 |
| 20140801003 | 9016 | 0205 | 2014.08.01 12:24 |
| ⋮ | ⋮ | ⋮ | ⋮ |

STORAGE EQUIPMENT AND DOOR-TO-DOOR DELIVERY SYSTEM

CROSS REFERENCE TO RELATED APPLICATIONS

This application relates to and claims priority from JP 2015-053501 filed Mar. 17, 2015, the entire contents of which are incorporated herein by reference.

FIGURE SELECTED FOR PUBLICATION

FIG. 1

BACKGROUND OF THE INVENTION

Technical Field

The present invention relates to a storage equipment and a door-to-door delivery system and methods for using and operating the same. More particularly, the present invention relates to the storage equipment that stores a plurality of packages delivered multiple different times to the same address and the same door-to-door delivery system with a related method of using and operating the same.

Technical Background

Recently, the lockable storage equipment, so-called door-to-door delivery locker, is installed in the common area and so forth in the housing complex and available for the door-to-door delivery service.

Relative to such door-to-door delivery system, the door-to-door carrier can store the delivery addressed to the resident in the box of the door-to-door locker and then lock the box even when the resident is absent and then after the resident can unlock the box to take out the delivery addressed to oneself. Accordingly, the door-to-door delivery locker is capable of preventing theft and provides for the delivery safely of stored items.

Patent Document 1, JP 1-15-98857, the entire contents of which are incorporated by references, discloses the common locker equipment as one of prior arts relative to the door-to-door delivery service applying such a locker.

With regard to the common locker equipment according to Patent Document 1, the number of a locker having the size fitting the package in is designated and the carrier opens the box's door to put the package in and closes the door thereof.

PRIOR ART

Patent Document

Patent Document 1: JP Patent Published H5-98857

ASPECTS AND SUMMARY OF THE PRESENT INVENTION

Aspects to be Solved

However, according to the locker equipment of Patent Document 1, since the number of boxes available to store the package is limited, the carrier has to bring back the package for the resident when all boxes are filled with packages on delivery time. In this scenario, it is problematic that the resident may not receive the package by the scheduled time.

Further, when a number of packages are delivered to the same resident it may be very cumbersome for the resident to open the same number of box doors as the number of packages delivered.

The present invention relates to solve the above problems and one purpose of the present invention is to provide a storage equipment and a door-to-door delivery system that can store efficiently deliveries in boxes and allows the resident to easily take out the delivery even when deliveries are delivered multiple times to the same resident.

Means for Solving the Problem

A storage equipment of the present invention to achieve such purpose is locked to store the delivery after deposited temporarily and comprises a multiple receiving box exclusively for each user, which is unlockable to receive an additional delivery to be stored even when an earlier delivery has already been previously stored therein.

In addition, the storage equipment of the present invention is locked to store the package after deposited temporarily and comprises a multiple receiving box exclusively for users, which stores the deliveries for each user; wherein if the carrier ID is input, an authentication is executed based on the carrier ID to unlock and allow the multiple receiving box to additionally receive a delivery even when the carrier stored the delivery in the multiple receiving box and the user has not taken out such delivery.

In addition, the storage equipment of the present invention further comprises a single receiving box commonly available for any users, wherein the delivery subject to the scheduled additional storage is stored in the single receiving box when the multiple receiving box has not enough space for the additional storage despite unlocking due to the allowed additional storage of the delivery to the multiple receiving box.

In addition, the storage equipment of the present invention records the carrier ID or the user ID input when the authentication for unlocking is executed and the multiple receiving box is unlocked.

In addition, according to the present invention, a door-to-door delivery system comprises the storage equipment described above and a control server connected to the storage equipment via the network, wherein the storage equipment sends the carrier ID or the user ID, input when the authentication for unlocking is executed and the multiple receiving box is unlocked, to the control server, and the control server records the receiving carrier ID or the receiving user ID when receives the carrier ID or the user ID, which are input when the authentication for unlocking is executed.

Further, according to the door-to-door delivery system of the present invention, the control server controls the authentication data including the carrier ID or the user ID and sends the authentication data every predetermined time or when the data content is updated, the storage equipment updates the authentication data stored in the own equipment to the content of the authentication data received from the control server when receives the authentication data from the control server.

In addition, any combination of the structure elements described above, and any replacements each other between the structure element and the expression method, the equipment, the system, the computer program and the medium receiving the computer program of the present invention are effective as one aspect of the present invention.

Effect of the Invention

According to the present invention, the storage equipment comprises a multiple receiving box exclusively for each user, which stores the deliveries for each user or the delivery that the user consigns to deliver, the carrier stores the deliveries in the multiple receiving box, wherein, if the carrier ID is input, an authentication is executed based on the carrier ID to unlock the multiple receiving box allowing to accept an additional storage of a delivery when the user has not taken out the delivery so that the delivery to the same recipient can be stored all together and the storage space of the storage equipment can be effectively used, accordingly.

BRIEF DESCRIPTION OF THE DRAWINGS

FIG. 3 is a table illustrating the structure of a resident DB according to the aspect of the Embodiment 1 of the present invention.

FIG. 4 is a table illustrating the structure of a carrier DB according to the aspect of the Embodiment 1 of the present invention.

FIG. 5 is a table illustrating the structure of the data of a storage box DB according to the aspect of the Embodiment 1 of the present invention.

FIG. 6 is a table illustrating the structure of the data of a multiple receiving history DB according to the aspect of the Embodiment 1 of the present invention.

FIG. 7 is a table illustrating the structure of the data of a single receiving history DB according to the aspect of the Embodiment 1 of the present invention.

DESCRIPTION OF THE ASPECT OF THE PREFERRED EMBODIMENTS

Embodiment 1

Aspect of the Embodiment 1

For example, a door-to-door delivery system of the aspect of the Embodiment 1 according to the present invention is installed in a housing complex where the resident of the housing complex is the user.

The door-to-door delivery system is applied for the door-to-door delivery locker service, wherein the carrier does not deliver the delivery directly to the resident by hand, but, instead, deposits temporarily the delivery in a storage equipment such as a locker and so forth followed by locking, and then after the resident unlocks and takes out the delivery for the resident per se from the storage equipment.

In addition, relative to the door-to-door delivery service, vice versa, the resident deposits temporarily the delivery, which is subject to be delivered, in a storage equipment followed by locking, and then after the carrier unlocks and takes out the delivery deposited by the resident for a delivery service.

An exclusive individual storage box subject to each resident in the address for delivery (multiple receiving box) is installed in the storage equipment so that the carrier can deposit the delivery in the exclusive storage box for the addressed resident. At this time, if the storage box is, needless to say, empty or even if an extra storage space remains despite the delivery deposited in advance, the delivery can be additionally deposited following unlocking.

Accordingly, with regard to the door-to-door delivery system according to the aspect of the present Embodiment, it constitutes that the carrier and the resident can unlock the storage box already containing the delivery so that the deliveries for the same addressee can be stored in one box all together and therefore, the storage space of the storage equipment can be effectively used.

Structure of the Embodiment 1

(1) Total Structure of a Door-to-Door Delivery System

Figure 1:
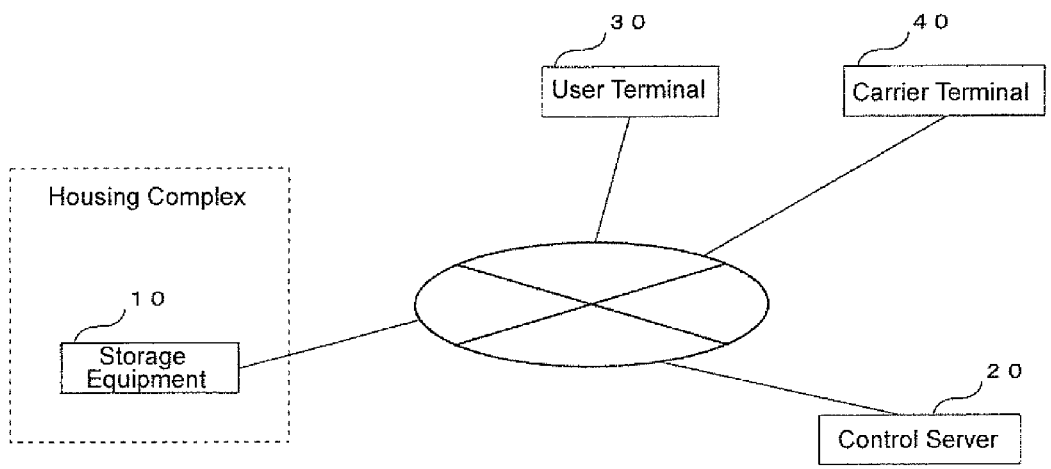
FIG. 1 is a schematic diagram illustrating the structure of a door-to-door system according to the aspect of the Embodiment 1 of the present invention.

FIG. 1 is a schematic diagram illustrating the structure of a door-to-door system according to the aspect of the Embodiment 1 of the present invention.

Referring to Fig., the door-to-door delivery system comprises: a storage equipment 10, which is installed in the common area and so forth of a housing complex, that stores the delivery delivered by a carrier for the door-to-door delivery service; a control server 20, which is connected to the storage equipment 10 via the network 100, that controls the data relative to the door-to-door delivery service described above; a user terminal 30, which is connected to the storage equipment 10 via the network 100, that is operated by the addressed user of the delivery described above; and a carrier terminal 40, which is connected to the storage equipment 10 via the network 100, that is operated by the carrier who delivers the delivery to the addressed resident described above.

(2) Structure of the Storage Equipment 10

The storage equipment 10, which is installed, e.g., in the common area of a housing complex, is an equipment having a storage and lockable function, e.g., a locker equipment.

Figure 2:
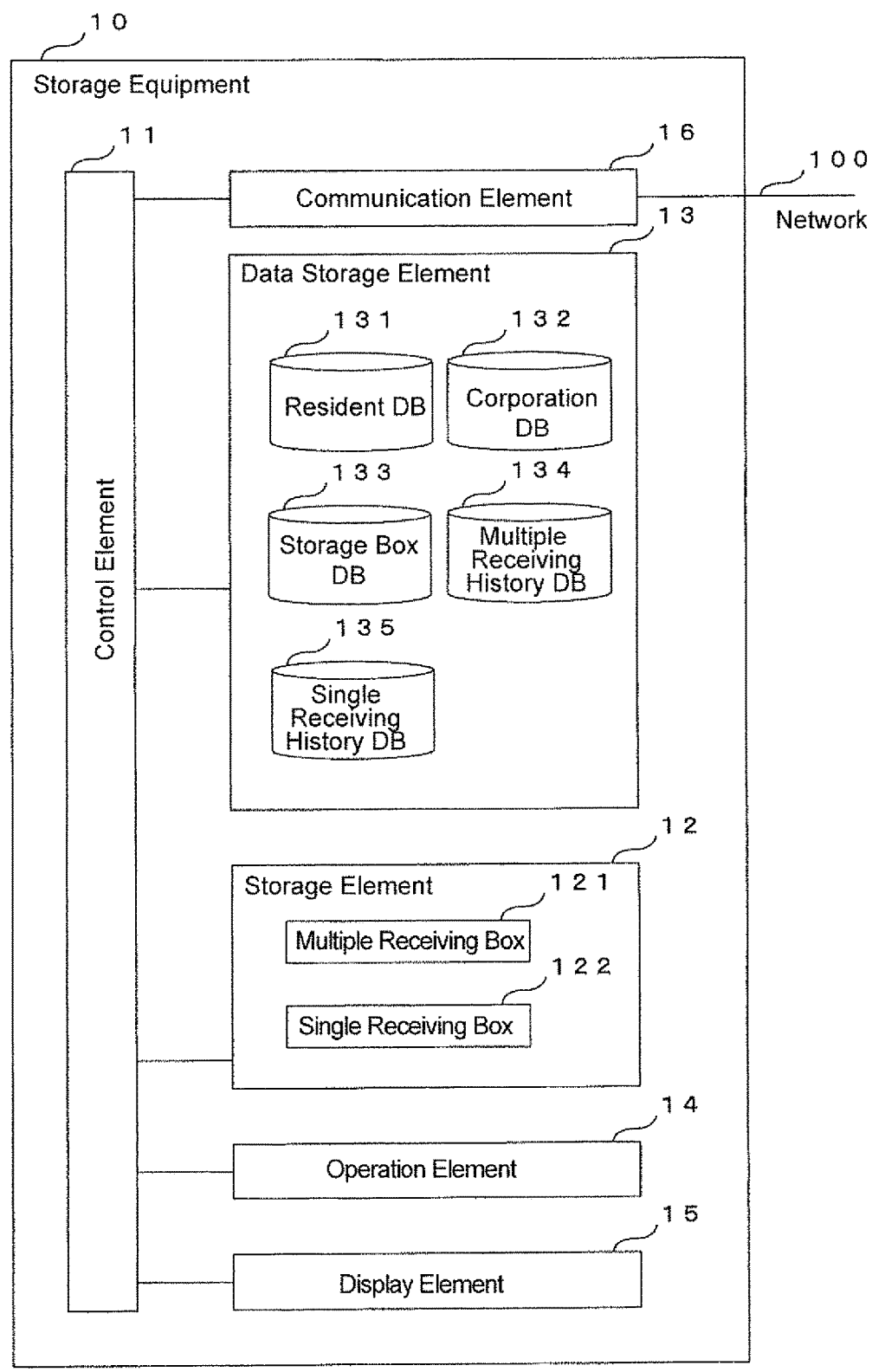
FIG. 2 is a schematic diagram illustrating the structure of the storage equipment according to the aspect of the Embodiment 1 of the present invention.

FIG. 2 is a schematic diagram illustrating the structure of the storage equipment 10 according to the aspect of the Embodiment 1 of the present invention.

Referring to FIG., the storage equipment 10 comprises; a control element 11, having, e.g., CPU and so forth, that controls the total storage equipment 10; a storage element 12 that stores the delivery for the addressee-resident; a data storage element 13 that stores a variety of data; an operation element 14, having a variety of keys and to which the data can be input, that reads out the data relative to the authentication, which are written in the corporation card and the resident card and so forth, described later, and so forth; a display element 15 that displays a variety of the data; and a communication element 16 that executes sending and receiving the data via the network 100.

The storage element 12 comprises a plurality of storage boxes that is lockable and unlockable to store the delivery for the addressee-resident.

As such storage box, a multiplicity of receiving the delivery is different between a multiple receiving box 121 and a single receiving box 122.

The multiple receiving box 121 is always locked regardless whether the delivery is stored or not, and the carrier or the resident can unlock based on the carrier card and the resident card in which each carrier and resident ID are written, respectively. And, as set forth later, the storage equipment 10 records the history every time when the multiple receiving box 121 is unlocked.

In addition, as set forth above, the multiple receiving box 121 can receive an additional delivery if the extra space is available when the delivery is already stored in the box and the carrier other than the resident unlocks using the carrier card.

According to one aspect of the present Embodiment, the multiple receiving box 121 is assigned to each dwelling unit and all residents of each dwelling unit utilize commonly one multiple receiving box 121 (all deliveries addressed to any residents are delivered to the same multiple receiving box 121. For example, if three family members including a father, a mother and a child reside in the dwelling unit, any deliveries addressed to the father, the mother and the child are stored in the multiple receiving box 121 exclusively assigned to the dwelling unit.

The single receiving box 122 can be structurally unlocked by the operation of the operation element 14 and so forth when no delivery is stored so that anyone who has neither corporation card nor resident card can store the delivery in the box. The box is locked following the delivery is stored and then after only the resident who is the addressee of the delivery can unlock the box using the resident card.

Specifically, if the delivery is once delivered and stored in the single receiving box 122, the carrier cannot unlock the instant box. After the resident unlocks the single receiving box 122 and takes out the delivery inside the box, the unlocked state is kept and the delivery can be freely stored.

The single receiving box 122 is assigned exclusively for neither the resident nor the specific dwelling and can be commonly used by any user (resident) receiving the door-to-door delivery service.

The data storage element 13 stores a variety of data relative to the door-to-door delivery service.

In addition, the data storage element 13 stores; a resident DB 131 that controls the authentication data including, e.g., password and so forth required when the resident unlocks the multiple receiving box 121; a corporation DB 132 that controls the authentication data including, e.g., password and so forth required when the carrier unlocks the multiple receiving box 121; a storage box 133 that controls the type and usage state of each storage box of the storage element 12; a multiple receiving DB 134 that controls the history relative to usage, e.g., storage and take-out of the delivery, of the multiple receiving box 121; and a single receiving DB 135 that controls the history relative to usage, e.g., storage and take-out of the delivery, of the single receiving box 122.

FIG. 3 is a table illustrating an example of the data structure of the resident DB 131 according to the aspect of the Embodiment 1 of the present invention.

Referring to FIG., the resident DB 131 stores the resident name, the resident's room number and the authentication password respectively corresponding to the individual ID (resident ID) that identify each resident.

The resident ID may be an identification data assigned individually to each resident or an identification data including the resident's room number of which the resident resides.

FIG. 4 is a table illustrating an example of the data structure of the corporation DB 132 according to the aspect of the Embodiment 1 of the present invention.

The corporation DB 132 is a database so as to control the corporation authentication data. The corporation includes the door-to-door delivery carrier, a laundry that launders the cleaning items for the resident and a food delivery service business to sell foods to the resident and so forth.

Referring to FIG., the corporation DB 132 stores; the entity to which the corporation, e.g., the carrier and so forth, belongs, the authentication password, and the data relative to eligibility data showing whether the corporation is permitted to unlock the multiple receiving box 121 or not, respectively corresponding to the individual ID (corporation ID) that identify each corporation.

Such corporation ID can be the identification data assigned to each delivery personnel or the identification data showing the entity to which the delivery corporation belongs.

FIG. 5 is a table illustrating the structure of the data of a storage box DB 133 according to the aspect of the Embodiment 1 of the present invention.

Referring to FIG., the storage box DB 133 stores; the type of each storage box of the storage element 12 (multiple receiving box 121 or single receiving box 122); the room number of the dwelling using exclusively the storage box when the storage box is a multiple receiving box 121; the delivery address or the room number of shipper resident when the storage box is the single receiving box 122; and the usage state of each storage box (in-use or not); corresponding to each individual ID (storage box ID) identifying each storage box.

The data relative to the usage state data of the storage box thereof is, e.g., locked/unlocked state, whether the delivery is inside the storage box or not and so forth.

FIG. 6 is a table illustrating the structure of the data of a multiple receiving history DB 134 according to the aspect of the Embodiment 1 of the present invention.

Referring to FIG., the multiple receiving history DB 134 controls; the corporation ID of the carrier who delivers the delivery in the multiple receiving box 121; the data showing whether the delivery is actually received in the multiple receiving box 121 or not; and the time data showing the date and the time when the delivery is stored; with the corresponding history control number specified every event including such as storing the delivery, every multiple receiving box 121.

FIG. 7 is a table illustrating the structure of the data of a single receiving history DB 135 according to the aspect of the Embodiment 1 of the present invention.

Referring to FIG., the single receiving history DB 135 controls; the corporation ID of the carrier who delivers (or deposits) the delivery or the resident ID of the resident in the single receiving box 122: the resident ID of the addressee-resident or the corporation ID of the entity utilizing the service; and the time data showing the date and the time when the delivery is stored; with the corresponding history control number specified every event including such as storing the delivery, every single receiving box 122.

The operation element 14 having a variety of keys and the resident or the carrier can operate to input own resident ID or the password for authentication to unlock the storage box.

Further, the operation element 14 can be integrally constructed with the display element 15 so as to be operative as a touch panel.

The display element 15 displays a message to remind an input of each data.

In addition, the display element 15 displays whether the delivery is stored in the multiple receiving box 121 or not and the single receiving box 122 currently not in-use when the resident or the carrier deposits the delivery.

The communication element 16 communicates the data (e.g., the resident ID for authentication, the password and so forth) input through the operation element 14 described above with the user terminal 30 via the network 100.

(3) Structure of the Control Server 20

The control server 20 is a data processing device that is connected to the storage equipment 10 via the network 100 and controls the data relative to the door-to-door delivery service as well as the storage equipment 10.

Figure 8:
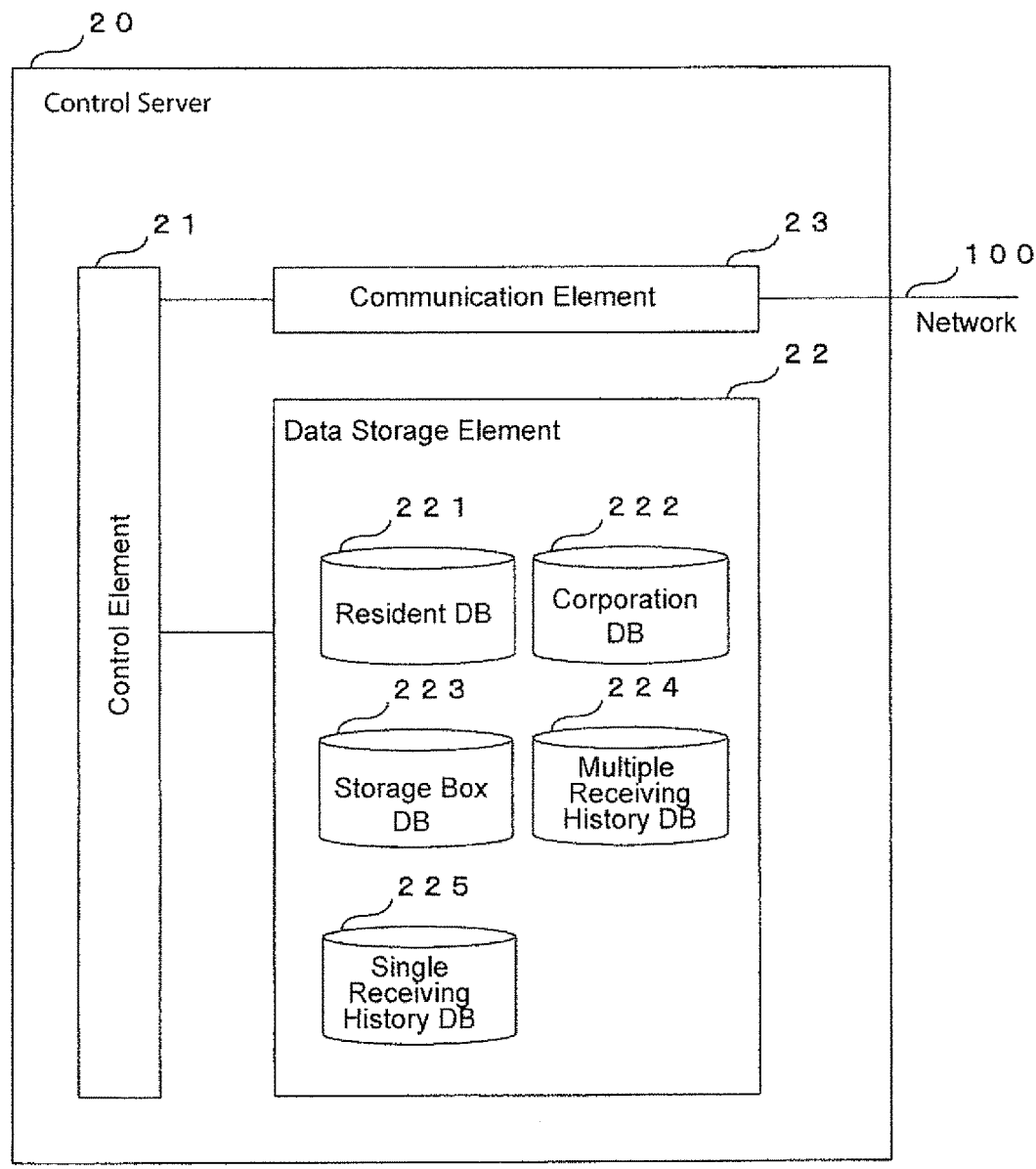
FIG. 8 is a schematic diagram illustrating the structure of a control server according to the aspect of the Embodiment 1 of the present invention.

FIG. 8 is a schematic diagram illustrating the structure of a control server 20 according to the aspect of the Embodiment 1 of the present invention.

Referring to FIG., the control server 20 comprises a control element 21 having, e.g., CPU and so forth so as to control the total control server 20; a data storage element 22 so as to store a variety of data; and a communication element 23 so as to send and receive the data via the network 100 to be connected.

The data storage element 22 stores the resident DB 221, the corporation DR 222, the storage box DB 223, the multiple receiving history DB 224 and the single receiving history DB 225.

The structure of the data of each database 221-225 is respectively the same as each data base 131-135 having the same name and stored in the storage equipment 10.

However, the resident DB 221 controls the personal data (address, phone number, e-mail address and so forth) in addition to the data structure of the resident DB 131.

In addition, the corporation DB 222 controls the personal data in the corporation (address, phone number, e-mail address and so forth) in addition to the data structure of the corporation DB 132.

In addition, the control server 20 is connected to the controller terminal (PC, portable terminal and so forth, not shown in FIG.) of the control entity of the control server 20 via the network 100 and the content of each database 221-225 in the control server 20 is updated by input through the terminal when, for example, the new resident or corporation is registered or the content is changed and so forth.

Every update or at predetermined timing, the control server 20 sends the data (but personal data of the resident and the corporation) in each updated data database 221-225 therein to the storage equipment 10 and then the storage equipment 10 updates the content in each database 131-135 stored in the storage equipment per se to the data content received from the control server 20 described above.

(3) Structure of the User Terminal 30

The user terminal 30 is a data processing device operated by the resident and so forth in the housing complex and can be a portable communication terminal, e.g., a smartphone, a cell phone, a personal handy-phone system (PHS), or a personal data assistant (PDA) and so forth, or a personal computer (PC), e.g., a tower computer, a desktop computer, and a notebook computer.

The user terminal 30 comprises an operation element including a key-switch and so forth and a display screen and is operable to input and display the data. Further, the user terminal 30 can send the data to and receive from the control sever 20 via the network 100.

The resident can access to the storage equipment 10 by using the user terminal 30 to confirm the delivery state or the storage state of the delivery in the storage equipment 10.

In addition, the storage equipment 10 sends the notice data to the user terminal so as to remind the resident taking out the delivery when the delivery addressed to the resident is stored in the storage equipment or the resident does not take out the delivery within the predetermined length after the delivery is delivered.

(4) Structure of the Carrier Terminal 40

The carrier terminal 40 is a data processing device operated by the carrier and can be a portable communication terminal, e.g., a smartphone, a cell phone, a personal handy-phone system (PHS), or a personal data assistant (PDA) and so forth, or a personal computer (PC), e.g., a tower computer, a desktop computer, and a notebook computer.

The carrier terminal 40 comprises an operation element including a key-switch and so forth and a display screen and is operable to input and display the data. Further, the carrier terminal 40 can send the data to and receive from the storage equipment 10 via the network 100.

The carrier can access to the storage equipment 10 through the carrier terminal 40 to confirm the storing state relative to the storage equipment 10.

(5) Structure of the Resident Card

The resident owns the resident card that is an ID card to execute the authentication in the storage equipment 10 so as to lock the storage equipment 10 and open the door thereof.

The resident card therefor is. e.g., contact/non-contact type data storage medium. in which the resident ID, the room number of the resident and the password and so forth are written.

The resident contacts the resident card to the storage equipment 10 or places thereover when unlock the storage equipment 10. The storage equipment 10 reads out the data in the resident card and if the read-out room number and password comply with each other, stored in the resident DB 131, the success authentication is found but vice versa if not comply with, the failure authentication will be found.

If success authentication, the single receiving box 122 exclusively for the resident or the multiple receiving box 121 storing the deliver addressed to the resident is unlocked and the resident can take out the delivery addressed to oneself or deposit the delivery consigned to shipping relative to the unlocked box.

(6) Structure of the Corporation Card

The corporation personnel (e.g., delivery service, laundry, food seller and so forth) takes an authentication relative to the storage equipment 10 and owns the corporation card, which is ID card to unlock and open the storage equipment 10.

The corporation card therefor is, e.g., contact/non-contact type data storage medium, in which the corporation ID and the password and so forth are written.

The corporation personnel contacts the corporation card to the storage equipment 10 or places thereover when unlock the storage equipment 10. The storage equipment 10 reads out the data in the corporation card and if the read-out corporation ID and password comply with each other, stored in the corporation DB 132, the success authentication is found but vice versa if not comply with, the failure authentication is found.

If success authentication, the identified multiple receiving box is unlocked by the operation element 14 so that the corporation personnel can store the delivery in the unlocked box and complete the delivery.

Operation of the Aspect to the Embodiment 1

(1) Operation by the Carrier when the Delivery is Delivered

Figure 9:
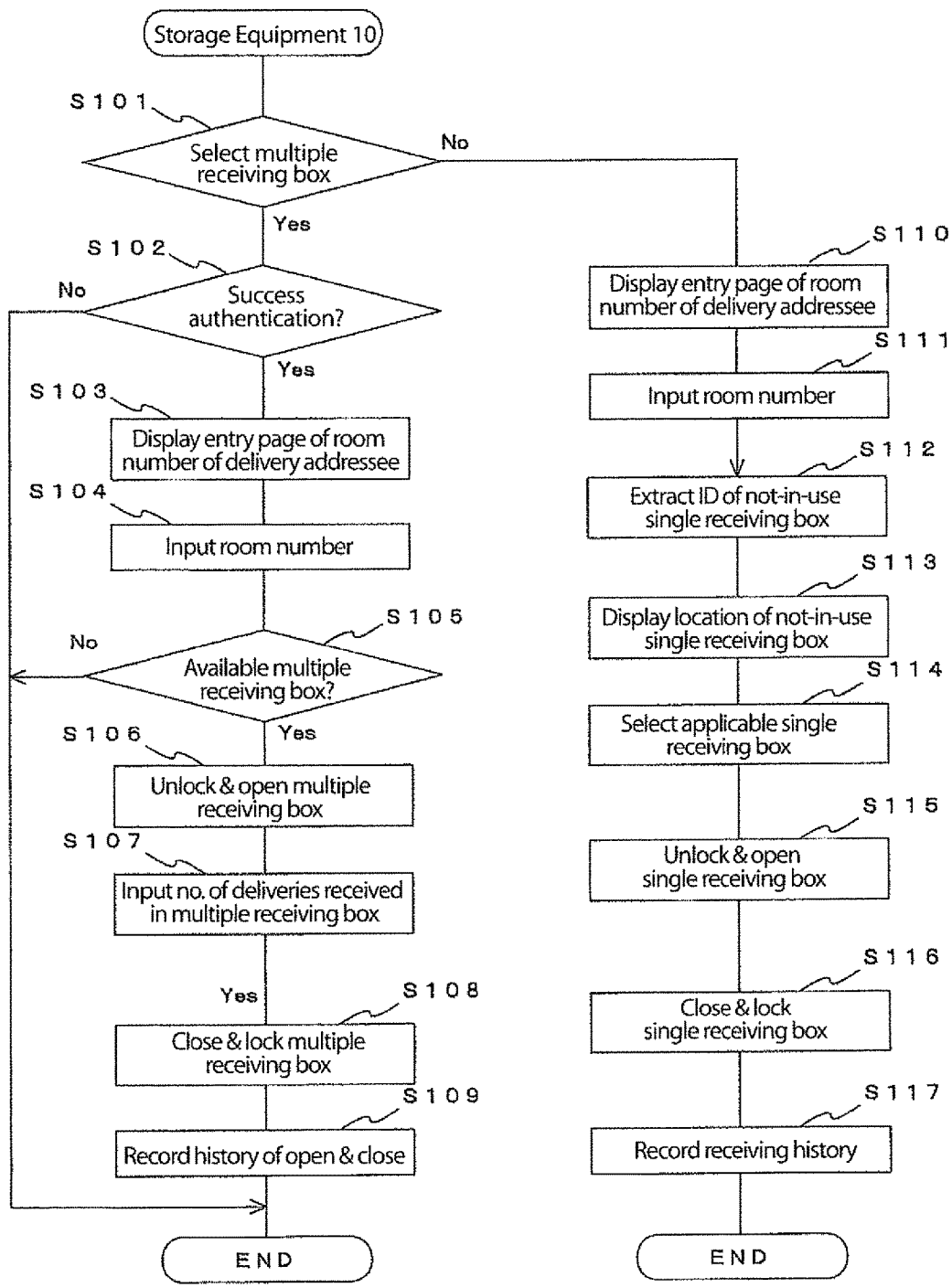
FIG. 9 is a decision tree illustrating the operation sequence relative to the door-to-door delivery system according to the aspect of the Embodiment 1 of the present invention when the carrier delivers the delivery to the resident.

FIG. 9 is a decision tree illustrating the operation sequence relative to the door-to-door delivery system according to the aspect of the Embodiment 1 of the present invention when the carrier delivers the delivery to the resident.

The inventor sets forth further referring to FIG., hereinafter.

First, the carrier arrives at the location, e.g., an entrance hall of the housing complex, where the storage equipment 10 is installed, with the delivery addressed to the resident.

The carrier selects the storage box to be stored at this time from "multiple receiving box" and "single receiving box" displayed in the display element 15, using the operation element 14 of the storage equipment 10 (Step S101.)

Here, if the multiple receiving box 121 is selected (Step S101/Yes), the carrier, for example, places the corporation card over the operation element 15 to get an authentication. Then, the operation element 15 of the storage equipment 10 read out the corporation ID and the password written in the corporation card and the control element 11 decides whether the read-out corporation ID and the password, stored in the corporation DB 132, complies with each other or not, and whether the entity specified in the corporation ID is eligible to unlock the multiple receiving box 121 or not (Step S102.)

Here, when stored not complying with each other or not allowed to unlock the multiple receiving box despite complying with, the storage equipment 10 decides the authentication failure and the operation is over.

On the other hand, when stored complying with each other and also allowed to unlock the multiple receiving box (Step S102/Yes), the storage equipment 10 decides the authentication success and the display element 14 displays the entry page relative to the room number of the addressee of the delivery (Step S103.)

Next, the carrier makes sure the shipping document and so forth attached to the delivery and inputs the room number of the addressee of the delivery in the input field of the room number entry page displayed on the display element 14 using the operation element 15 (Step S104.)

Then, the control element 11 of the storage equipment 10 decides, referring to the storage box DB 133, whether there is the multiple receiving box 121 corresponding to the input room number described above (Step S105.)

At this time, if there is no multiple receiving box 121 corresponding to the room number, i.e., the resident of the referred room number is not taking the receiving service relative to the multiple receiving box 121 (Step S105/No), the operation is over as-is.

And then, the carrier selects a "single receiving box" at the Step S101 at this time (Step S101.) The operation is set forth later in detail since "single receiving box" is selected.

If the corresponding multiple receiving box 121 is available (Step S105/Yes), the control element 11 unlocks and opens the corresponding multiple receiving box 121 (Step S106.)

The carrier makes sure the storage state of the opened multiple receiving box 121, stores the number of delivered deliveries corresponding to the empty space at this time and inputs the number of received deliveries using the operation element 14 (Step S107.)

And then, the carrier closes the multiple receiving box 121 and locks (Step S108.)

In addition, the control element 11 of the storage equipment 10 records the history in which the carrier unlock-and-opens the multiple receiving box 121 so as to store the delivery in the multiple receiving history DB 134 (Step S109.) Specifically, the corporation ID input in the above step S102, the data showing actual receiving in the multiple receiving box 121, the number of received deliveries, the data relative to the date and time and so forth are recorded in the multiple receiving history DB 134 of the multiple receiving box 121.

The operation is now over.

On the other hand, if no extra space is available, the carrier inputs "0" as the number of received deliveries or leaves null (Step S107) and then closes the door as-is and locks therefor (Step 108.)

Also at this time, the control element 11 records the history in which the carrier unlock-and-opens the multiple receiving box so as to store the delivery in the multiple receiving history DB 134 (Step S109.)

Specifically, the corporation ID input in the above step S102, the data showing no actual receiving in the multiple receiving box 121, the data relative to the date and time and so forth are recorded in the multiple receiving history DB 134 of the multiple receiving box 121.

So far, at Step S101, the inventor set forth the operation when the receiving is selected in the multiple receiving box 121 and hereafter, the inventor sets forth the operation when the receiving is selected in the single receiving box 122.

The carrier selects the single receiving box 122 to be stored at this time from "multiple receiving box" and "single receiving box" displayed on the display element 15, using the operation element 14 of the storage equipment 10 (Step S101/No), the display element 15 display the input page for the room number (Step S110.)

Next, the carrier inputs the room number of the addressee of the delivery in the room number entry page using the operation element 14 (Step S111.)

In addition, the data other than the room number may be input here if the data identifies the addressee-resident.

Next, the control element 11 refers to the storage box DB 133, identifies the not-in-use single receiving box 122 and extracts the storage box ID of such single receiving box 122 (Step S112.)

Then, the control element 11 displays the location and so forth of the not-in-use single receiving box 122 on the display element 14 based on the extracted storage box ID therefor (Step S113.)

Next, the carrier selects any one of more than one not-in-use single receiving boxes 122 displayed on the display element 15 using the operation element 14 (Step S114.)

The control element 11 unlocks and opens the selected single receiving box 122 (Step S115.)

The carrier stores the delivery in the opened single receiving box 122 and then closes and locks therefor (Step S116.)

Then, the control element 11 records the history, in which the carrier stores the delivery in the single receiving box 122, in the single receiving history DB 135 (Step S117.) Specifically, the room number or the corresponding resident ID thereto input in the step S111, the data relative to the date and time are recorded in the single receiving history DB 135 of such single receiving box 122.

Then after, the resident comes to the location where the storage equipment 10 is installed and operates the operation element 15 to let read out the data in the resident card, and the storage equipment 10 executes the authentication based on the read-out data relative to the resident card, and if success authentication, such single receiving box 122 is unlocked and opened.

The operation is now over.

In addition, as described above, when the carrier closes and locks therefor without storing the delivery, the display element 14 displays the location of the not-in-use single receiving box 122 and so forth to remind receiving in the single receiving box 122, but the control element 11 may recognize, by the following way, that the door is closed as-is without storing the delivery.

For example, the control element 11 recognizes the incident by that the carrier inputs the data thereof (e.g., by pushing the pre-set button) using the operation element 15 after closing the door and locking as-is.

In addition, e.g., a weight sensor is installed inside the multiple receiving box 121 or the single receiving box 122, the total weight of the deliveries inside the box before and after open and close the door is weighed and the measurement result may be output to the control element 11. In such scenario, the control element 11 compares the weight data input from the weight sensor before and after opening/closing the door and decides that the carrier closed the door and locked as-is without storing any delivery if the weight after closing the door did not increase from the weight when opening the door. In addition, an infrared sensor and so forth instead of the weight sensor or in addition thereto may be installed so as to monitor the storing state inside the multiple receiving box 121 or the single receiving box 122.

In addition, according to the aspect of the Embodiment described above, the inventor sets forth the example in which the carrier delivers the delivery and stores in the storage equipment 10 but the door-to-door system conducts the same procedure even when the laundry stores the cleaned garments for the resident in the storage equipment 10 or the foods seller and so forth delivers the goods (e.g., foods and so forth) ordered by the resident to the storage equipment 10.

(2) Operation by the resident when the delivery is deposited

Figure 10:
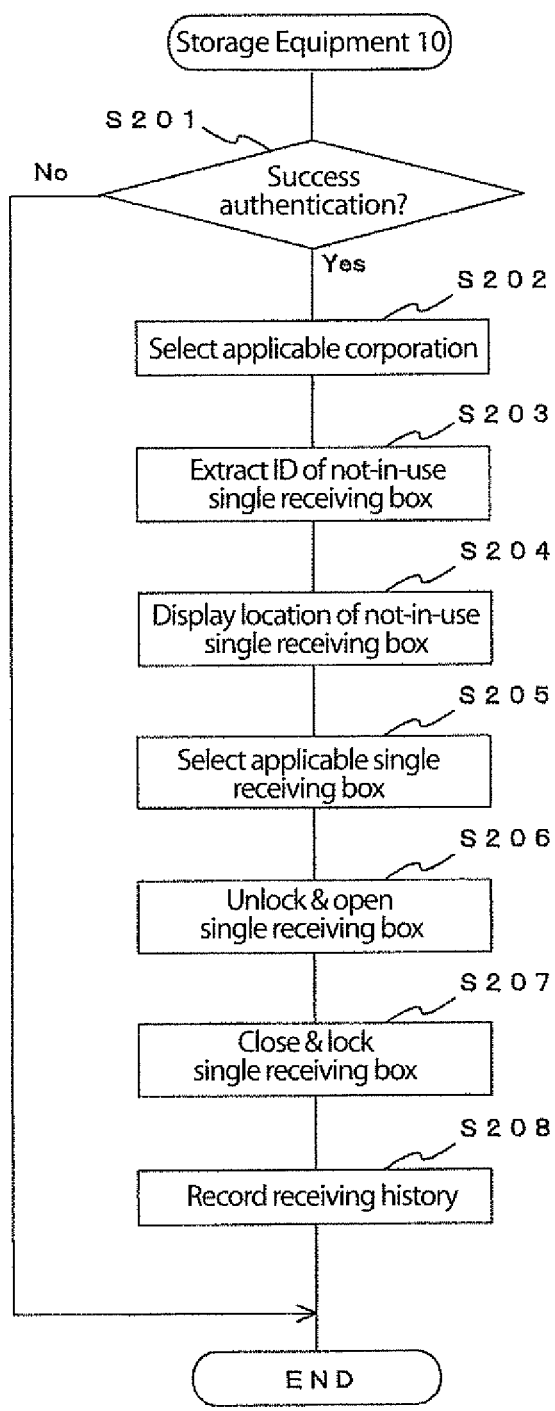
FIG. 10 is a decision tree illustrating the operation sequence relative to the door-to-door delivery system according to the aspect of the Embodiment 1 of the present invention when the resident consigns the delivery to deliver to the carrier.

FIG. 10 is a decision tree illustrating the operation sequence relative to a door-to-door delivery system according to the aspect of the Embodiment 1 of the present invention, wherein the resident consigns the carrier to deliver the delivery.

The inventor sets forth further referring to FIG., hereinafter.

As set forth above, the resident deposits once the delivery in the storage equipment 10 when consigning the carrier to deliver the delivery.

First, the resident arrives at the location, e.g., an entrance hall of the housing complex, where the storage equipment 10 is installed, with the delivery expected to be delivered.

Then, when the resident places the resident card over the operation element 15 for the authentication, the operation element 15 of the storage equipment 10 read out the resident ID and the password written in the resident card and the control element 11 decides whether the read-out resident ID and the password, stored in the resident DB 131, complies with each other or not (Step S201.)

At this time, when not complying with each other (Step S201/No), the storage equipment 10 decides that the failure authentication is found and the operation is over, accordingly (Step S105.)

On the other hand, when stored complying with each other, the control element 11 of the storage equipment 10 decides the authentication success (Step S201/Yes) and the entry page to select the corporation available for the resident is displayed.

For example, each service including, e.g., "door-to-door delivery", "laundry", "foods delivery" and so forth is displayed on the selection page so that the resident can select the necessary service to be applied from the displayed services using the operation element 15 (S202.)

Here, for example, the resident selects "door-to-door delivery service."

The control element 11 refers to the storage box DB 133, identifies the not-in-use single receiving box 122 and extracts the storage box ID of such single receiving box 122 when the service ("door-to-door delivery service") is selected from the selection page described above (Step S203.)

Next, the control element 11 displays the location and so forth of the not-in-use single receiving box 122 on the display element 14 based on the extracted storage box ID therefor (Step S204.)

Next, the resident selects any one of more than one not-in-use single receiving boxes 122 displayed on the display element 15 using the operation element 14 (Step S205.)

The control element 11 unlocks and opens the corresponding multiple receiving box 122 (Step S206.)

The resident stores the delivery in the opened single receiving box 122 and then closes and locks therefor (Step S207.)

Then, the control element 11 records the history in which the resident unlock-and-opens the single receiving box 122 so as to store the delivery in the single receiving history DB 135 (Step S208.) Specifically, the resident ID input in the above step S201, the corporation ID of the corporation for the selected service in the step S202, and the data relative to the date and time and so forth are recorded in the single receiving history DB 134 of the single receiving box 122.

The operation is now over.

Summary of the Embodiment 1

As set forth above, according to the door-to-door delivery system of the aspect of the present Embodiment, the multiple receiving box 121 is unlocked despite already storing the delivery and if an extra storage space is available, the delivery can be added to be stored so that the space of the storage equipment 10 can be effectively utilized. Particularly, the present invention is beneficial when the installation space, e.g., the common area and so forth of the housing complex for the storage equipment 10 is limited.

In addition, according to the door-to-door delivery system of the aspect of the present Embodiment, ID of the carrier or the resident who opens the multiple storage box 121 is recorded as the history so that the resident can easily identify the cause thereof by requesting the managerial corporation of the control server 20 to provide the individual data who opened the multiple storage box 121 in certain time period when the delivery already stored in the multiple storage box 121 is lost or damaged.

In addition, according to the aspect of the present Embodiment, even when the exclusive multiple receiving box 121 is not assigned or even when no extra storage space is available in the multiple receiving box 121, the storage equipment 10 constitutes the structure capable of storing the delivery in the single storage box 122 so that the resident can receive the delivery stored in the storage equipment 10 even if the resident per se is absent.

In addition, a detection means equipped with the infrared sensor and so forth capable of detecting existence-or-non-existence or amount of goods inside the multiple receiving box 121 of the storage element 12 may constitute the structure by which an extra storage space of the multiple receiving box 121 can be detected.

In the case of such structure, the control element 11 of the storage equipment 10 acquires the detection result by the above sensor following the success authentication and unlocks such multiple receiving box 121 when the extract space in such multiple receiving box 121 is found.

In contrast, the control element 11 of the storage equipment 10 unlocks a not-in-use single receiving box 122 when no extract space in such multiple receiving box 121 is found.

Accordingly, the door-to-door delivery system equips the detection means and decides the type of the storage box to be unlocked based on the detection result therefrom so that the carrier or the resident can avoid a troublesome work, in which the door is just opened to make sure the state of the receiving box, even when no extra space is available in the box.

Embodiment 2

Aspect of the Embodiment 2

According to the door-to-door delivery system of the aspect of the Embodiment 1, the storage equipment 10 stores each database 131-135 in the data storage element 13 and executes unlock processing based on the data in each corresponding database 131-135.

On the other hand, according to the door-to-door delivery system of the aspect of the Embodiment 2 of the present invention, the control server 20 refers to each database 221-225 stored per se and can constitutes the step of executing the authentication processing and so forth for unlock instead of the storage equipment 10.

Hereafter, unless otherwise specifically described, the inventor sets forth as the aspect of the present Embodiment is the same as the aspect of the Embodiment 1.

Structure of the Embodiment 2

(1) Total Structure of a Door-to-Door Delivery System

The door-to-door delivery system according to the aspect of the Embodiment 2 as well as the aspect of the Embodiment 1 comprises, a storage equipment 10, which is installed in the common area and so forth of a housing complex, that stores the delivery delivered by a carrier for the door-to-door delivery service; a control server 20, which is connected to the storage equipment 10 via the network 100, that controls the data relative to the door-to-door delivery service described above; a user terminal 30 that is operated by the addressed user of the delivery described above; and a carrier terminal 40, which is connected to the storage equipment 10 via the network 100, that is operated by the carrier who delivers the delivery to the addressee-resident described above.

(2) Structure of the Storage Equipment 10

The storage equipment 10, as well as the Embodiment 1, comprises a control element 11, a storage element 12, a data storage element 13, an operation element 14, a display element 15 and a communication element 16.

The storage equipment 10 according to the present Embodiment does not store each database 131-135 in the data storage element 13, which is different from the aspect of the Embodiment 1.

When the data are input from the operation element 14, the storage equipment 10 sends such data to the control server 20 from the communication element 16 via the network 100. In addition, when received the data from the control server 20 via the network 100, the communication element 16 stores such received data in the data storage element 13 and can display the received data on the display 15.

(3) Structure of the Control Server 20

The control server 20 according to the aspect of the present Embodiment as well as the aspect of the Embodiment 1, comprises a control element 21, a data storage element 22 and a communication element 23.

According to the aspect of the present Embodiment, the control server 20 executes an authentication processing and a registration processing relative to the history based on the data received from the storage equipment 10 via the network 100.

Operation of the Aspect to the Embodiment 2

(1) Operation by the Carrier when the Delivery is Delivered

Figure 11:
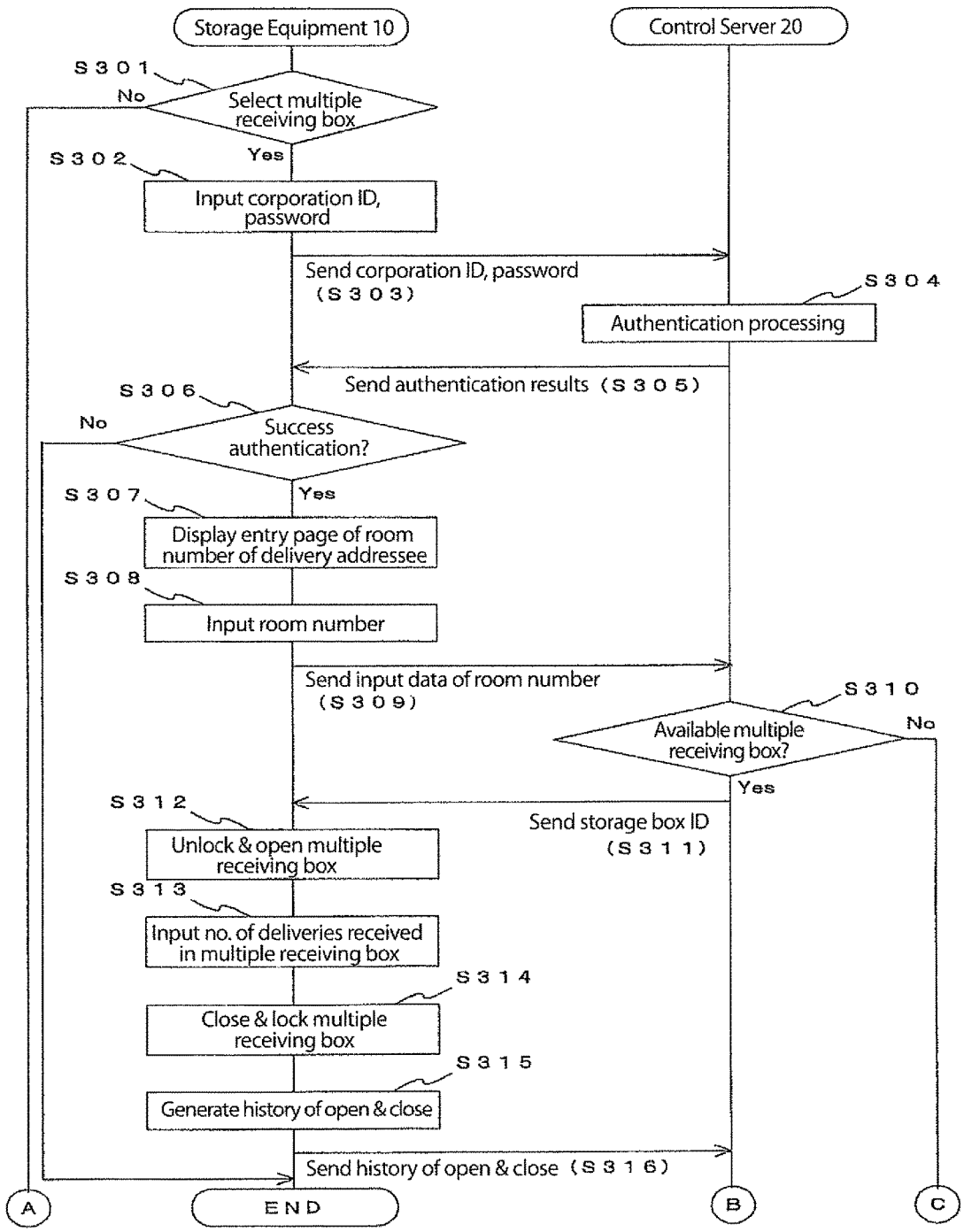
FIG. 11 is a decision tree illustrating the operation sequence relative to the door-to-door delivery system according to the aspect of the Embodiment 2 of the present invention when the carrier delivers the delivery to the resident.
Figure 12:
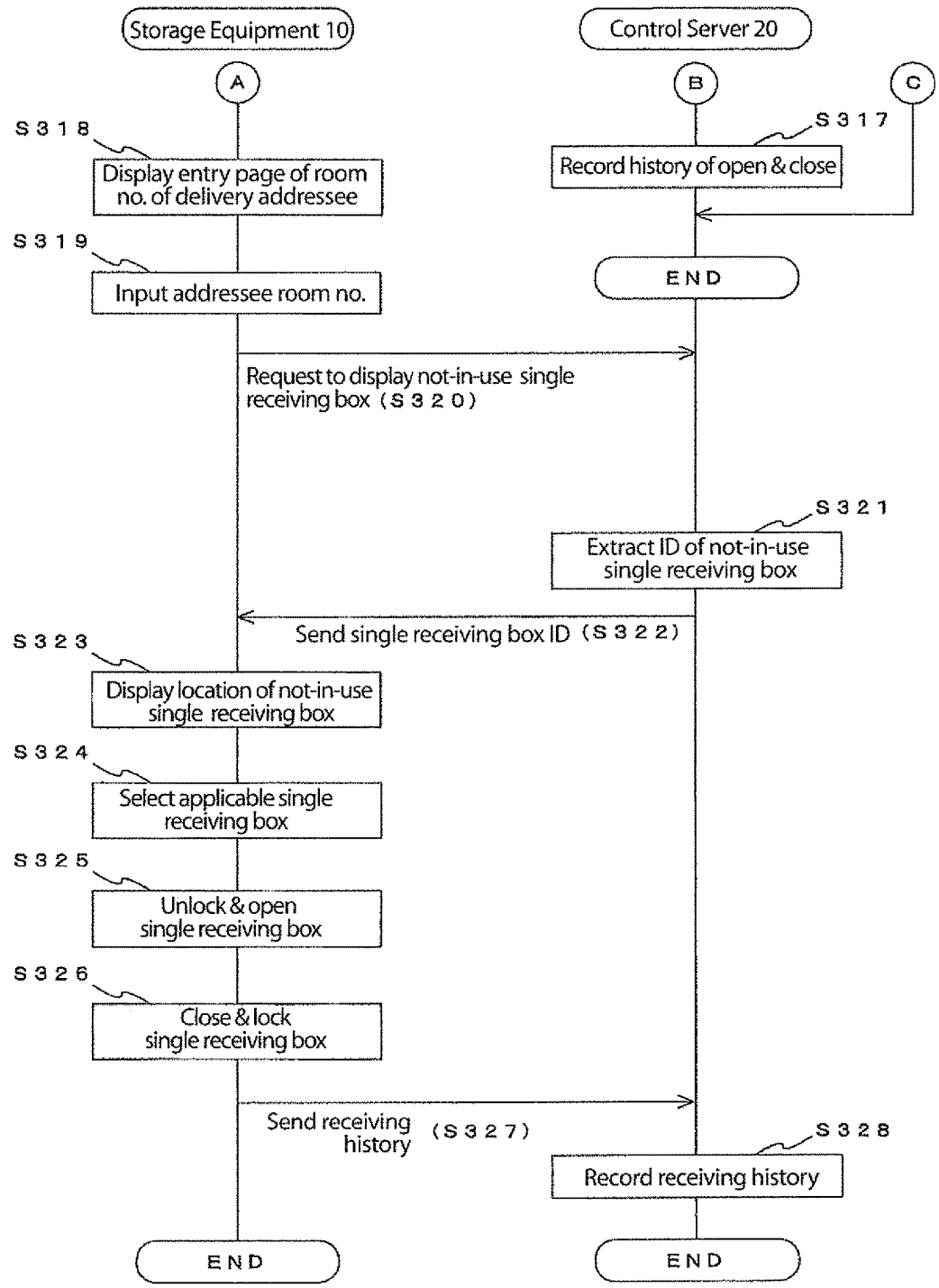
FIG. 12 is a decision tree illustrating the operation sequence relative to the door-to-door delivery system according to the aspect of the Embodiment 2 of the present invention when the carrier delivers the delivery to the resident.

FIG. 11, 12 are a decision tree illustrating the operation sequence relative to the door-to-door delivery system according to the aspect of the Embodiment 2 of the present invention when the carrier delivers the delivery addressed to the resident.

The inventor sets forth further referring to FIG., hereinafter.

First, the carrier arrives at the location such as the entrance hall of the housing complex with the delivery addressed to the resident, where the storage equipment 10 is installed, and selects the storage box to be stored at this time from "multiple receiving box" and "single receiving box" displayed on the display element 15, using the operation element 14 of the storage equipment 10 (Step S301.)

Here, if the multiple receiving box 121 is selected (Step S301/Yes), the carrier, for example, places the corporation card over the operation element 15 to get an authentication. Then, the operation element 15 of the storage equipment 10 reads out the corporation ID and the password written in the corporation card (Step S302.)

Next, the storage equipment 10 sends the read-out the corporation ID and the password to the control server 20 (Step S303.)

When received the corporation ID and the password from the storage equipment 10, the control server 20 decides whether the received corporation ID and the password are stored complying with each other or not, and whether the entity specified in the corporation ID is eligible to unlock the multiple receiving box 121 or not (Step S304.)

Here, when stored not complying with each other or not allowed to unlock the multiple receiving box 121 despite complying with, the control server 20 decides the failure authentication and sends the authentication result relative to the failure authentication to the storage equipment 10 (Step S305.)

The storage equipment 10 suspends the operation when received the authentication result relative to the failure authentication (Step S306/No.)

On the other hand, when stored complying with each other and allowed to unlock the multiple receiving box 121 (Step S304/Yes), the control server 20 decides the success authentication and sends the authentication result relative to the success authentication to the storage equipment 10 (Step S305.)

The operation element 14 displays the entry page of the room number of the addressee of the delivery when the storage equipment 10 received the authentication result relative to the success authentication (Step S307.)

Next, the carrier makes sure the shipping document and so forth attached to the delivery and inputs the room number of the addressee of the delivery in the input field of the room number entry page displayed on the display element 14 using the operation element 15 (Step S308.)

Then, the storage equipment 10 sends the input room number thereof to the control server 20 (Step S309.)

Then, the control server 20 decides, referring to the storage box DB 223, whether the multiple receiving box 121 corresponding to the input room number described above is available or not when received the room number from the storage equipment 10 (Step S310.)

At this time, when no multiple receiving box 121 corresponding to the room number is available, i.e., the resident having the referred room number is not taking the receiving service relative to the multiple receiving box 121 (Step S310/No), the operation is over as-is.

And then, the carrier selects a "single receiving box" at the Step S301 at this time (Step S301.) The operation is set forth later since "single receiving box" is selected.

If the corresponding multiple receiving box 121 is available (Step S310/Yes), the storage box ID thereof is sent to the storage equipment 10 (Step S311.)

The control element 11 unlocks and opens the corresponding multiple receiving box 121 to the storage box ID when the storage equipment received the storage box ID thereof (Step S312.)

The carrier makes sure the storage state of the opened multiple receiving box 121, stores the number of delivered deliveries corresponding to the empty space at this time and inputs the number of received deliveries using the operation element 14 (Step S313.)

And then, the carrier closes the multiple receiving box and locks (Step S314.)

In addition, at this time, the control element 11 of the storage equipment 10 generates the history in which the carrier unlock-and-opens the multiple receiving box 121 (Step S315.)

Then, the storage equipment 10 sends the generated history thereof to the control server 20 (Step S316.)

The control server 20 records the received history in the multiple receiving history DB 224 when received the generated history thereof from the storage equipment 10 (Step S317.)

Specifically, the corporation ID input in the above step S302, the data showing actual receiving in the multiple receiving box 121, the number of received deliveries, the data relative to the date and time and so forth are recorded in the multiple receiving history DB 224 of the multiple receiving box 121.

The operation is now over.

On the other hand, when no extra space is available, the carrier inputs "0" as the number of received deliveries or leaves the number as null (Step S313) and then closes the door as-is and locks therefor (Step S314.)

Also at this time, the control element 11 generates the history relative to that the carrier closed the door and locked without storing any delivery (Step S315) and the communication element 16 sends the generated history thereof to the control server 20 (Step S316.)

The control server 20 records the received history in the multiple receiving history DB 224 when received the generated history thereof from the storage equipment 10 (Step S317.)

Specifically, the corporation ID input in the above step S301, the data showing no actual receiving in the multiple receiving box 121, the data relative to the date and time and so forth are recorded in the multiple receiving history DB 224 of the multiple receiving box 121.

So far, relative to Step S301, the inventor set forth the operation when the receiving is selected in the multiple receiving box 121 and hereafter, the inventor sets forth the operation when the receiving is selected in the single receiving box 122.

The carrier selects the single receiving box 122 to be stored at this time from "multiple receiving box" and "single receiving box" displayed in the display element 15, using the operation element 14 of the storage equipment 10 (Step S301/No), the display element 15 display the input page for the room number (Step S318.)

Next, the carrier inputs the room number of the addressee of the delivery in the input field of the above room number entry page using the operation element 14 (Step S319.)

In addition, the data other than the room number may be input here if the data identifies the addressee-resident.

Next, the storage equipment 10 sends a request for retrieving the display page relative to the currently not-in-use single receiving box 122 to the storage equipment 10 (Step S320.)

The control server 20 refers to the storage box DB 233, identifies the not-in-use single receiving box 122 and extracts the storage box ID of such single receiving box 122 when received the above request for retrieving the display page relative to the currently not-in-use single receiving box 122 from the storage equipment 10 (Step S321.)

Then, the control server 20 sends the above extracted storage box ID to the storage equipment 10 (Step S322.)

Then, when the storage equipment 10 received the above storage box ID, the control element 11 displays the location and so forth of the not-in-use single receiving box 122 on the display element 14 based on the received storage box ID therefor (Step S323.)

Next, the carrier selects any storage box to be stored from more than one single receiving boxes 122 displayed on the display element 15 using the operation element 14 (Step S324.)

The control element 11 unlocks and opens such selected single receiving box 122 (Step S325.)

The carrier stores the delivery in the opened single receiving box 122 and then closes and locks therefor (Step S326.)

Next, the control element 11 generates the history, in which the carrier stores the delivery in the single receiving box 122 and the storage equipment 10 sends the generated receiving history thereof to the control server 20 (Step S327.)

The control server 20 receives the receiving history in the above single receiving box 122 thereof from the storage equipment 10 and then records the incident in the single receiving history DB 225 of the data storage element 22 (Step S328.) Specifically, the room number or the corresponding resident ID thereto input in the step S302, the data relative to the date and time are recorded.

The operation is now over.

(2) Operation by the Resident when the Delivery is Deposited

Figure 13:
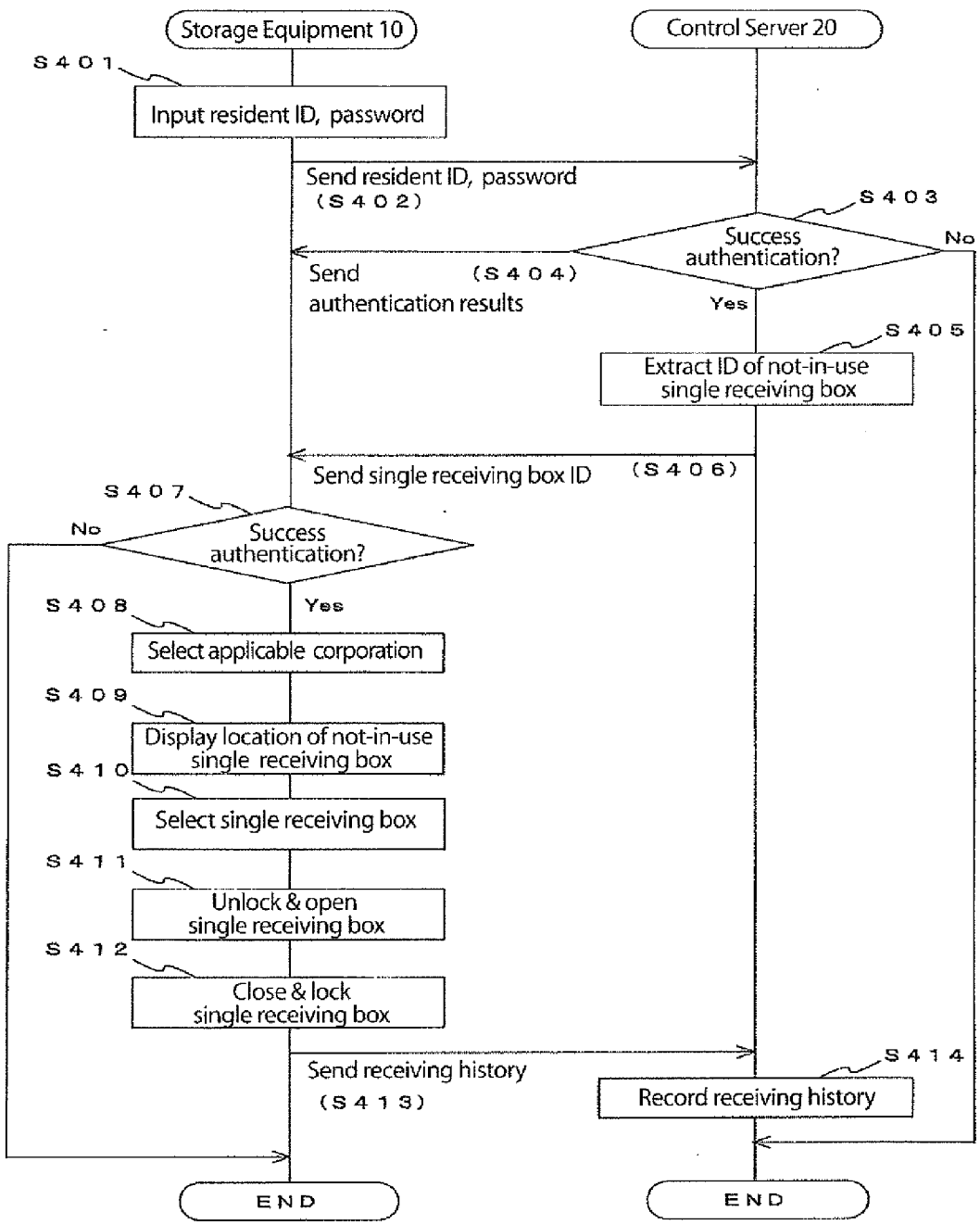
FIG. 13 is a decision tree illustrating the operation sequence relative to the door-to-door delivery system according to the aspect of the Embodiment 2 of the present invention when the resident delivers the delivery to the resident.

FIG. 13 is a decision tree illustrating the operation sequence relative to the door-to-door delivery system according to the aspect of the Embodiment 2 of the present invention when the resident delivers the delivery of the addressee-resident.

The inventor sets forth further referring to FIG., hereinafter.

First, when the resident comes to the location of the storage equipment 10 installed in the entrance hall and so forth of the housing complex with the delivery to be expected for delivery and places the resident card over the operation element 15 for the authentication and so forth, the operation element 15 of the storage equipment 10 read out the resident ID and the password written in the resident card (Step S401.)

Then, the storage equipment 10 sends the readout resident ID and the password to the control server 20 (Step S402.)

The control server 20 decides whether the received resident ID and the password are stored complying with each other or not in the resident DB 222 when received the resident ID and the password from the storage equipment 10 (Step S403.)

Here, when stored not complying with each other, the control server 20 decides the failure authentication and sends the authentication result relative to the failure authentication to the storage equipment 10 (Step S404.)

The storage equipment 10 suspends the operation when received the authentication result relative to the failure authentication (Step S407/No.)

On the other hand, when stored complying with each other, the control server 20 decides the success authentication (Step S403/Yes), refers to the storage box DB 223, identifies the not-in-use single receiving box 122 and extracts the storage box ID of such single receiving box 122 (Step S405.)

Then, the control server 20 sends the above extracted storage box ID to the storage equipment 10 (Step S406.)

When received the above storage box ID due to the success authentication (Step S407/Yes), the storage equipment 10 displays the selection page of the corporation available for the resident.

For example, each service (corporation) including, e.g., "door-to-door delivery", "laundry", "foods delivery" and so forth is displayed on the selection page so that the resident can select the necessary service to be applied from the displayed services using the operation element 15 (S408.)

Here, for example, the resident selects "door-to-door delivery service."

Then, the control element 11 displays the location and so forth of the not-in-use single receiving box 122 on the display element 14 based on the storage box ID received from the above control server 20 therefor when selected the service ("door-to-door delivery") in the above selection page (Step S409.)

Next, the resident makes sure the display on the display element 14 and selects any one of more than one not-in-use single receiving boxes 122 displayed on the display element 15 using the operation element 14 (Step S410.)

The control element 11 unlocks and opens such selected single receiving box 122 (Step S411.)

The carrier stores the delivery in the opened single receiving box 122 and then closes and locks therefor (Step S412.)

At this time, the control element 11 generates the history, in which the resident stores the delivery in the single receiving box 122 and the communication element 16 sends the generated history thereof to the control server 20 (Step S413.)

The control server 20 records the history thereof in the single receiving history DB 225 when received the generated history thereof from the storage equipment 10 (Step S414.)

Specifically, the resident ID input in the above step S401, the corporation ID of the corporation for the selected service in the step S407, and the data relative to the date and time and so forth are recorded in the single receiving history DB 225 of the single receiving box 122.

The operation is now over.

Summary of the Embodiment 2

As set forth above, according to the door-to-door delivery system of the present Embodiment, the control server 20 connected to the storage equipment 10 via the network 100 is additionally installed and the control server 20 replacing the storage equipment 10 executes the authentication processing based on each database 221-225 so that the effect can be obtained, in which the processing load on the storage equipment 10 can be reduced, in addition to the effect in accordance with the aspect of the Embodiment 1.

In addition, when a plurality of storage equipment 10 is configured to connect within the network 100 relative to the aspect of the present Embodiment, the control server 20 executes comprehensively authentications and so forth relative to each storage equipment 10 so that the processing in the total system can become efficient.

In addition, according to the aspect of the present Embodiment, the control server 20 replacing the storage equipment 10 execute the authentication processing, decides whether an exclusive multiple receiving boxes 121 to such resident is available or not, or whether a not-in-use single receiving box 122 is available or not, but can constitute the step of executing a part of the processing for the storage equipment 10.

In addition, the storage equipment 10 and the control server 20 may share each database 131-135, 221-225 and the control server 20 can constitute the data back-up for the storage equipment 10.

Summary of Embodiments

As set forth above, according to the door-to-door delivery system of the aspect of the present Embodiment 1, 2, the multiple receiving box 121 is unlocked despite already storing the delivery and when an extra storage space is available, the delivery can be added to be stored so that the space of the storage equipment 10 can be effectively utilized. Particularly, the present invention is beneficial when the installation space, e.g., the common area and so forth of the housing complex for the storage equipment 10 is limited.

In addition, according to the door-to-door delivery system of the aspect of the present Embodiment 1, 2, the ID of the carrier or the resident who opens the single storage box 122 is recorded as the history so that the cause therefor can be easily identified when the delivery already stored in the single storage box 122 was lost or damaged.

In addition, according to the aspect of the present Embodiment 1, 2, even when the exclusive multiple receiving box 121 is not assigned or even when no extra storage space is available in the multiple receiving box 121, the structure of the storage equipment 10 is capable of storing the delivery in the single storage box 122 so that the resident can receive the delivery stored in the storage equipment 10 even if the resident is absent per se. In addition, the resident can always request to consign the delivery to ship.

In addition, according to the above Embodiment, when no exclusive multiple receiving box 121 is available for the resident, or when no sufficient storage space is available in the multiple receiving box 121, the carrier re-selects the "single receiving box" in the selection page, which can receive the delivery; but when the storage equipment 10 decides that no resident-exclusive multiple receiving box 121 is available or when the number of delivery is input as "0", the structure of the storage equipment 10 can constitute the step of displaying automatically and reminding the receiving in the single receiving box 122. At this time, the storage equipment 10 may automatically display the location of the empty single receiving box 122.

The storage equipment 10, the control server 20, the user terminal 30 and the carrier terminal 40 described above are brought into reality by principally CPU and programs loaded in the memory. However, a combination of any hardware and software other than that can make the equipment and the server and high freedom of such structure can be easily understood by a person skilled in the art.

In addition, when the storage equipment 10, the control server 20, the user terminal 30 or the carrier terminal 40 set forth above constitute a group of software modules; the programs stored in an optical recording medium, a magnetic recording medium, a magneto-optical medium, or semiconductors and so forth can be loaded from the above medium or can be loaded from an connected outside device via the preset network.

In addition, the above aspects of Embodiments are examples of preferable Embodiments and the aspects of the Embodiment of the present invention are not limited to the examples and a variety of alternative examples can be applied unless departing from the scope of the present invention.

For example, according to the Embodiment as set for above, one resident is provided with one resident ID but the ID may be provided per dwelling.

Further, according to the present Embodiment, the resident is a user applying for the door-to-door delivery system, but when the door-to-door delivery system is installed in the facility such as a station, a public facility or a convenient store and so forth, the user thereof is counted as the resident.

REFERENCE OF SIGNS

10 Storage equipment
11, 21 Control element
12 Storage element
13, 22 Data storage element
14 Operation element
15 Display element
16 Communication element
20 Control server
30 User terminal
40 Carrier terminal
100 Network
121 Multiple receiving box
122 Single receiving box
131, 221 Resident DB
132, 222 Corporation DB
133, 223 Storage box DB
134, 224 Multiple receiving history DB
135, 225 Single receiving history DB

What is claimed is:

1. A storage equipment system, comprising:
  a plurality of multiple receiving boxes, for exclusively storing deliveries designated to ones of a plurality of users;
  wherein the storage equipment system is operably lockable to temporarily store a first delivery after a first deposition, and if a carrier ID is input into said storage equipment system to generate an authentication then said authentication is executed to unlock and allow said plurality of multiple receiving boxes to additionally receive at least a second delivery after said first delivery in ones of said plurality of multiple receiving boxes prior to a user removing any first or later delivery;
  a single receiving box that is commonly available for all said plurality of users;
  a sensor to determine a contents of said multiple receiving boxes; and
  a sensor for monitoring a storing state inside said multiple receiving boxes, wherein the storing state is communicated to at least one of said receiving box having a display element and a carrier terminal, wherein when at least one storing state of said plurality of multiple receiving boxes is unavailable and in-use, then unlocking the single receiving box.

2. The storage equipment system, according to claim 1, wherein:
  said storage equipment system additionally records one of a carrier ID and a user ID input when an authentication for unlocking is executed by ones of said users and said multiple receiving box is unlocked.

3. A door-to-door delivery system, comprising:
  a storage equipment system, comprising:
    a plurality of multiple receiving boxes, for exclusively storing deliveries designated to ones of a plurality of users;
    wherein the storage equipment system is operably lockable to temporarily store a first delivery after a first deposition, and if a carrier ID is input into said storage equipment system to generate an authentication then said authentication is executed based upon said designated carrier ID to unlock and allow said plurality of multiple receiving boxes to additionally receive at least a second delivery after said first delivery in ones of said plurality of multiple receiving boxes prior to a user removing any prior said delivery;
    a single receiving box that is commonly available for all said plurality of users;
    a sensor to determine a contents of said plurality of receiving boxes;
    a sensor for monitoring a storing state inside said multiple receiving boxes, wherein the storing state is communicated to at least one of said receiving boxes having a display element and said carrier terminal, wherein when at least one of the storing state of said plurality of multiple receiving boxes is unavailable and in-use, then unlocking the receiving box;
    said storage equipment system additionally records one of a carrier ID and a user ID input when an authentication for unlocking is executed by ones of said users and said multiple receiving box is unlocked; and a control server operably connected to the storage equipment system via a network; and wherein said storage equipment system operably sends one of the carrier ID and the user ID, which is input when the authentication for unlocking is executed and said multiple receiving box is unlocked, to said control server, and said control server records the one said received carrier ID or the said received user ID when said one of said carrier ID and said user ID is input upon the authentication for unlocking.

4. The door-to-door delivery system, according to claim 3, wherein:

said control server controls the authentication data including one of the said carrier ID and the user ID and sends said authentication data to said storage equipment at a predetermined time, when said authentication data content is updated, the authentication data stored in said storage equipment is updated to the content of the authentication data received from said control server.

* * * * *